(12) United States Patent
Bandas

(10) Patent No.: US 8,874,596 B2
(45) Date of Patent: *Oct. 28, 2014

(54) IMAGE PROCESSING SYSTEM AND METHOD

(75) Inventor: Peter Bandas, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 5 days.

This patent is subject to a terminal disclaimer.

(21) Appl. No.: 12/500,801

(22) Filed: Jul. 10, 2009

(65) Prior Publication Data

US 2009/0276464 A1 Nov. 5, 2009

Related U.S. Application Data

(63) Continuation of application No. 10/787,780, filed on Feb. 26, 2004, now Pat. No. 7,624,123.

(51) Int. Cl.
*G06F 17/30* (2006.01)
*G06K 9/60* (2006.01)
*G06K 9/00* (2006.01)

(52) U.S. Cl.
CPC ...... *G06K 9/00664* (2013.01); *G06F 17/30256* (2013.01); *Y10S 707/99945* (2013.01); *Y10S 707/99948* (2013.01)
USPC ............. 707/758; 382/305; 707/999.104; 707/999.107

(58) Field of Classification Search
CPC .......... H04N 1/00204; H04N 1/00336; G06F 17/30265; G06F 17/30247; G06F 17/30244
USPC ............. 707/736, 758, 790, 802, 803, 805; 382/305, 190, 205, 180, 115
See application file for complete search history.

(56) References Cited

U.S. PATENT DOCUMENTS 5,751,286 A 5/1998 Barber et al.
5,835,667 A 11/1998 Wactlar et al.
(Continued)

FOREIGN PATENT DOCUMENTS

JP 09293081 A 11/1997
JP 10-091634 4/1998
(Continued)

OTHER PUBLICATIONS

International Search Report from European Patent Office; International Application No. PCT/IB2005/000489; dated Aug. 8, 2005.

(Continued)

*Primary Examiner* — Hung T Vy
(74) *Attorney, Agent, or Firm* — Faegre Baker Daniels LLP

(57) ABSTRACT

An image processing system and method receives one or more digital images in the form of image data, including selected object data of a digital image, and determines, by an electronic recognition process, if a recognition match is available between the selected object data of the digital image and image object library data associated with image descriptor library data. An automated library user interface presents selectable matched object descriptor data associated with the image descriptor library data when a recognition match occurs between the selected object data of the digital image and the image descriptor library data. In response, the automated library user interface provides user feedback data to confirm that the image descriptor library data corresponds with the selected object data of the digital image, or entered descriptor data if no match or an incorrect match occurs, to create library descriptor associated image data.

23 Claims, 6 Drawing Sheets

(56) References Cited

U.S. PATENT DOCUMENTS

| | | | |
|---|---|---|---|
| 6,032,156 | A | 2/2000 | Marcus |
| 6,182,069 | B1 | 1/2001 | Niblack et al. |
| 6,304,259 | B1 | 10/2001 | DeStefano |
| 6,418,424 | B1 | 7/2002 | Hoffberg et al. |
| 6,445,834 | B1 * | 9/2002 | Rising, III .................... 382/305 |
| 6,463,426 | B1 | 10/2002 | Lipson et al. |
| 6,564,263 | B1 | 5/2003 | Bergman et al. |
| 6,594,406 | B1 | 7/2003 | Hecht |
| 6,801,657 | B1 | 10/2004 | Cieplinski |
| 7,006,714 | B2 | 2/2006 | Kasutani |
| 7,031,555 | B2 | 4/2006 | Troyanker |
| 7,269,285 | B2 | 9/2007 | Bober et al. |
| 7,277,891 | B2 | 10/2007 | Howard et al. |
| 7,624,123 | B2 * | 11/2009 | Bandas ................................ 1/1 |
| 2003/0033296 | A1 | 2/2003 | Rothmuller et al. |
| 2003/0086627 | A1 | 5/2003 | Berriss et al. |
| 2003/0110163 | A1 | 6/2003 | Chen et al. |
| 2003/0120673 | A1 * | 6/2003 | Ashby et al. ................ 707/100 |
| 2003/0147555 | A1 | 8/2003 | Bober et al. |
| 2004/0059754 | A1 | 3/2004 | Barghout et al. |
| 2004/0156535 | A1 | 8/2004 | Goldberg et al. |
| 2004/0213437 | A1 | 10/2004 | Howard et al. |
| 2005/0193006 | A1 | 9/2005 | Bandas |

FOREIGN PATENT DOCUMENTS

| | | | |
|---|---|---|---|
| JP | 11272707 | A | 8/1999 |
| WO | 0045292 | | 8/2000 |
| WO | 0124050 | A1 | 4/2001 |

OTHER PUBLICATIONS

Bronez, Thomas P. et al.; Image & Video Retrieval for National Security Applications: An Approach Based on Multiple Content Codebooks; Mitre Product MP97W; Jun. 1997; pp. 1-19.

Video Analysis and Content Exploitation; VACE Phase II Kick-Off; Nov. 14, 2003; Advanced Research and Development Activity (ARDA) webpage; pp. 1-2.

Shyu, Mei-Ling et al.; Image Database Retrieval Utilizing Affinity Relationships; The ACM Digital Library; Portal ACM webpage; 2003.

French, James C. et al.; An Application of Multiple Viewpoints to Content-Based Image Retrieval; The Guide to Computing Literature; Portal ACM webpage; 2003.

Idee Revolutionary Visual Search Technologies—Espion and Cumulus, Canto; Idee, Inc. webpage; Feb. 4, 2004; pp. 1-3.

Multimedia Data Management: Using Metadata to Integrate and Apply digital Media; McGraw-Hill Professional Publishing Search Catalog/Order; MMBook webpage; Feb. 4, 2004.

King, Irwin et al.; A Feature-Based Image Retrieval Database for the Fashion, Textile, and Clothing Industry in Hong Kong; Department of Computer Science and Engineering, the Chinese University of Hong Kong; 1996; pp. 1-8.

Japanese Office Action; Japanese Application No. 2007-500317; dated Nov. 9, 2010.

* cited by examiner

IMAGE PROCESSING SYSTEM AND METHOD

RELATED APPLICATIONS

This application is a continuation of co-pending U.S. application Ser. No. 10/787,780, filed Feb. 26, 2004, entitled "IMAGE PROCESSING SYSTEM AND METHOD", having as inventor Peter Bandas, owned by instant assignee and is incorporated herein by reference.

FIELD OF THE INVENTION

The invention relates generally to image processing systems, and more particularly to image processing systems for organizing image data.

BACKGROUND OF THE INVENTION

There has been a proliferation of multimedia libraries, such as digital image, digital video and digital audio libraries, in the recent past. This is due, at least in part, to the ease of digitalization of images, video and audio through, for example, the widespread use of digital cameras, digital video and digital voice recorders and the availability of the Internet as a medium for accessing and exchanging these media in an efficient manner. It is becoming increasingly important for image processing systems to organize these multimedia libraries to provide capabilities for browsing, searching and retrieval of image data in these multimedia libraries.

The explosive growth of multimedia libraries and other archives has made searching for specific information increasingly more difficult. This difficulty is due, at least in part, to a lack of tools to support the efficient creation of descriptive multimedia libraries and to facilitate searching these resources. Due to the sheer volume of information available, it is not sufficient simply to store the digital image, video or audio and replay it at a later date. New technology is needed to create, organize and search these vast multimedia libraries.

In addition to the problems associated with efficiently creating the multimedia library, there are problems with effectively searching it for needed information. Searching text typically involves using keywords. In addition, the multimedia library may be searched based on one or more filter criteria associated with the multimedia for the display of the results. For example, first and second filter criteria may be applied to a descriptive file name associated with a digital image. However, since a comprehensive listing of the content of the digital image within the multimedia library was never created, searching for a specific descriptive file name associated with the digital image would not be possible.

According to one method, to facilitate searching the multimedia database, descriptors may be manually associated with object data within the digital image in order to more efficiently search for specific digital images or video clips, for example; however, the descriptors associated with the object data must be manually entered. For example, a user typically must review each object in an image and then manually enter a descriptor to be associated with the viewed image. However, this process is time-consuming, inefficient and cost-prohibitive and, as a result, is often not performed. Further, manually entering a descriptor for association with image data increases the likelihood that a selected object may be stored under different descriptors due to misspelling of the descriptor or variant spellings of the same descriptor. As a result, such a method for creating the multimedia library limits the search to descriptors previously manually associated with the multimedia library and, therefore, does not permit the retrieval of an image with a misspelled descriptor or with no descriptor previously associated with the object. Consequently, an effective, thorough search of the multimedia database is not possible.

BRIEF DESCRIPTION OF THE DRAWINGS

The present invention is illustrated by way of example and not limitation of the accompanying figures, in which like reference numerals indicate similar elements and in which.

DETAILED DESCRIPTION OF THE PREFERRED EMBODIMENTS

Figure 1:
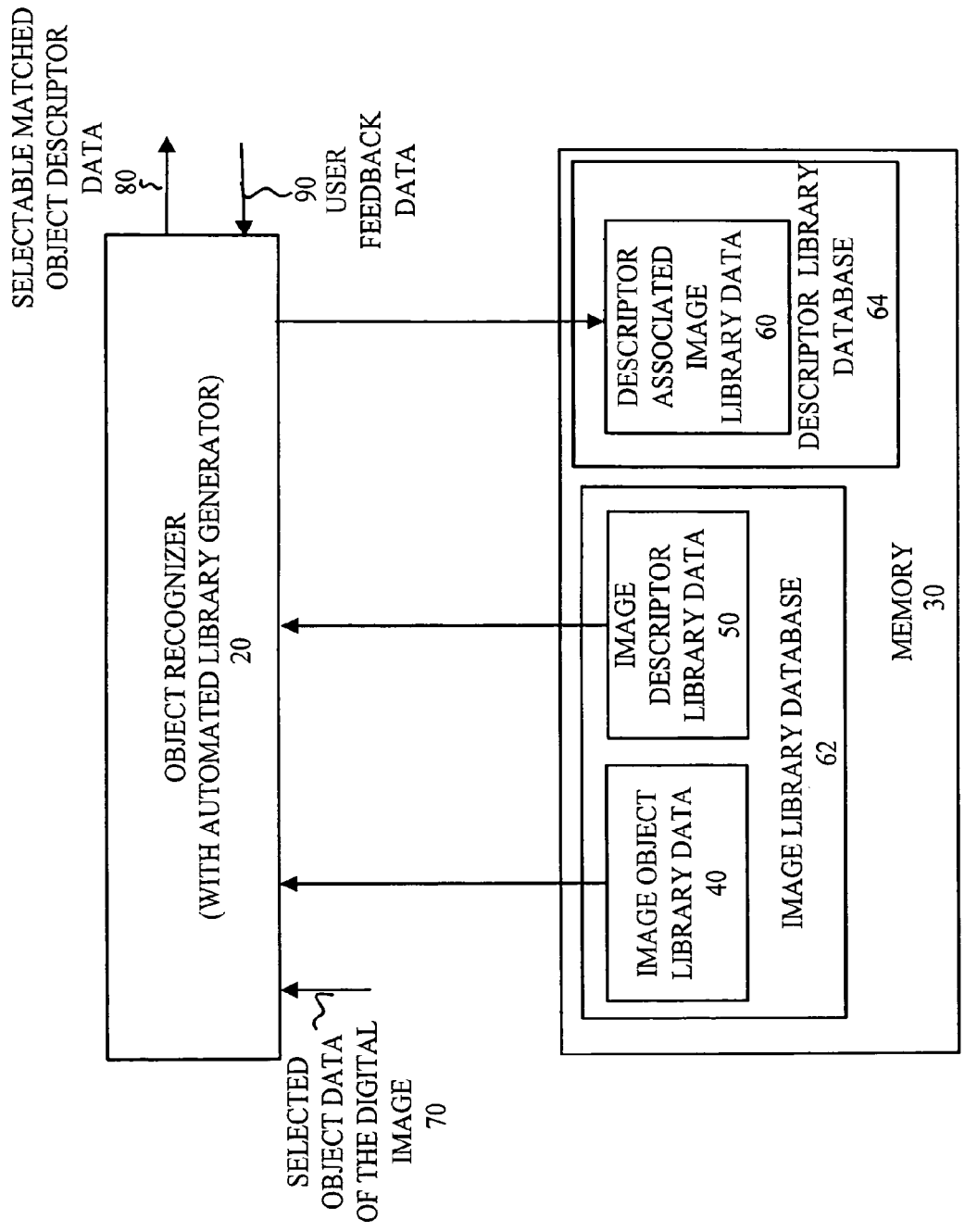
FIG. 1 is a block diagram illustrating one example of an image processing system in accordance with one exemplary embodiment of the invention.

An image processing system and method receives one or more digital images in the form of image data, including selected object data of a digital image, and determines, by an electronic recognition process, if a recognition match occurs between the selected object data of the digital image and stored image object library data. An image library database provides an association between the image object library data and image descriptor library data. For example, a user may previously have formed an association between the image object library data and image descriptor library data to create the image library database. An automated library user interface presents selectable matched object descriptor data associated with the image descriptor library data when a recognition match occurs between the selected object data of the digital image and the image descriptor library data. The automated library user interface provides user feedback data in response to presenting the selectable matched object descriptor data to confirm that the image descriptor library data correspond with the selected object data of the digital image. Alternatively, the automated library user interface provides entered descriptor data if no match or an incorrect match occurs between the image descriptor library data and the selected object data of the digital image. The image processing system and method associates the image descriptor library data or the entered descriptor data with the digital image to create descriptor associated image library data.

The image processing system includes an object recognizer with automated library generator and memory. The memory contains at least image object library data and image descriptor library data associated with the image object library data. The image object library data may have previously been associated with image descriptor library data and stored within the image library database in the memory, such as by a user or via the object recognizer. The object recognizer with automated library generator may be part of a host processor, a coprocessor, such as a graphics coprocessor, or any suitable device for performing image recognition on the selected object data of the digital image. The object recognizer with automated library generator receives the selected object data of the digital image, the image object library data and the image descriptor library data and, in response, determines if a recognition match is available between the selected object data of the digital image and the image object library data. If a recognition match is available between the selected object data of the digital image and the image object library data, the object recognizer presents the selectable matched object descriptor data associated with the image object library data. The memory stores the descriptor associated image library data into the descriptor library database in response to receiving the user feedback data.

Among other advantages, the present invention quickly and efficiently generates descriptor associated image library data associating either image descriptor library data or entered descriptor data with the image data to create the descriptor library database. The object recognizer with automated library generator automatically performs image recognition by attempting to match the selected object data of the digital image with image object library data previously associated with the image descriptor library data. When a recognition match occurs between the image object library data and the selected object data of the digital image, the object recognizer with automated library generator automatically presents to the user the selectable matched object descriptor data associated with the image descriptor library data. A user may provide user feedback data to confirm that the image descriptor library data associated with the selectable matched object descriptor data actually match the selected object data of the digital image. Since the selectable matched object descriptor data are automatically generated by the object recognizer, the user may simply select from a list of available descriptors produced in the selectable matched object descriptor data for association with the digital image. Alternatively, the user may simply select an attribute in a pull-down menu for association with the digital image. As a result, the object recognizer with automated library generator may quickly and efficiently generate a library of descriptor associated image data in order to facilitate a later search for the desired image data.

If no recognition match is available between the selected object data of the digital image and the image object library data, then the user may provide entered descriptor data for association with the selected object data of the digital image, thereby facilitating the creation of new image object library data and the corresponding image descriptor library data. For example, the selectable matched object descriptor data may include recently or commonly selected descriptor data in the event a match does not occur. Accordingly, the image processing system "learns" new image object library data and the associated new image descriptor library data for future automated recognition. As the image object library data and the library of descriptor image data grows in size, then the likelihood that the selected object data of the digital image was already previously associated with image descriptor library data increases. Therefore, as the library grows in size, the image processing system further increases the speed and efficiency of creating the selectable matched object descriptor data. Further, the creation of the descriptor associated image library data permits the image processing system to add new image object library data and image descriptor library data and improves the ability to search for specific image descriptor library data.

The descriptor associated image library data may be compiled into a user-defined list, such as a table of contents, index or any suitable database structure, in order to facilitate a later search of specific descriptor associated image library data. For example, several digital images may be associated with corresponding image descriptor library data. Accordingly, the image descriptor library data and the digital images may be organized by the user in one or more photo albums in order to facilitate searching for a particular digital image or related digital images.

FIG. 1 is a block diagram of an image processing system 10, including an object recognizer with automated library generator 20 and memory 30. The object recognizer with automated library generator 20 may be one or more suitably programmed processors, such as a microprocessor, a microcontroller or a digital signal processor (DSP), and therefore includes associated memory, such as memory 30, which contains instructions that, when executed, cause the object recognizer with automated library generator 20 to carry out the operations described herein. In addition, the object recognizer with automated library generator 20 includes off-the-shelf image recognition software, as is known in the art. For example, the object recognizer with automated library generator 20 may perform image recognition of one or more objects within a digital image based on at least one feature recognition characteristic as is known in the art. In addition, the object recognizer with automated library generator 20, as used herein, may include discrete logic, state machines or any other suitable combination of hardware, software, middleware and/or firmware. The object recognizer with automated library generator 20 may include an automated library generator, such as suitable database software, to create a descriptor library database 64 for associating the digital image with a descriptor. According to one embodiment, the automated library generator includes a Microsoft Access database program, or any suitable database program, to associate the digital image with a suitable descriptor. The various elements of the image processing system 10 are connected by a plurality of links. The links may be any suitable mechanisms for conveying electrical signals or data, as appropriate.

Memory 30 includes image object library data 40, image descriptor library data 50 and descriptor associated image library data 60. For example, the image object library data 40 may represent one or more objects in a digital image, such as a picture of a person, place or thing or a graphic such as a video game character or symbol. An image library database 62 provides an association between the image object library data 40 and the image descriptor library data 50. For example, the image object library data 40 may have previously been associated with image descriptor library data 50 and stored within the image library database 62 in the memory 30, such as by a user or via the object recognizer with automated library generator 20. The descriptor associated image library data 60 may associate a digital image with image descriptor library data 50 to create the descriptor library database 64.

The memory 30 may be, for example, random access memory (RAM), read-only memory (ROM), optical memory or any suitable storage medium located locally or remotely, such as via a server or distributed memory if desired. Additionally, the memory 30 may be accessible by a wireless base station, switching system or any suitable network element via the Internet, a wide area network (WAN), a local area network (LAN), a wireless wide access network (WWAN), a wireless local area network (WLAN) such as but not limited to an IEEE 802.11 wireless network, a Bluetooth® network, an infrared communication network, a satellite communication network or any suitable communication interface or network.

According to one embodiment, the object recognizer with automated library generator 20 may be part of a computer system or other processor-based system. The computer system, or other processor-based system, may include a central processing unit, video graphics circuitry, system memory and other suitable peripheral circuits. In such systems, the central processing unit functions as a host processor while the video graphics circuitry (e.g., a graphics coprocessor) functions as a loosely coupled coprocessor. By way of example, the video graphics circuitry may be an integrated circuit on a single semiconductor die, such as an application-specific integrated circuit (ASIC). Additionally, the video graphics circuitry may include memory, such as, but not limited to, dynamic random access memory (DRAM). This memory may reside on the same semiconductor die (ASIC) as the video graphics circuitry or it may be separate and connected through board level or package level traces.

According to one embodiment, the object recognizer with automated library generator 20 may be part of the host processor or, alternatively, may be part of the video graphics circuitry. Similarly, memory 30 may be part of system memory, graphics memory or any other suitable memory. For example, the above described operation may be implemented on a software program, such as a driver program, executed by a host processor or any suitable processor.

Figure 2:
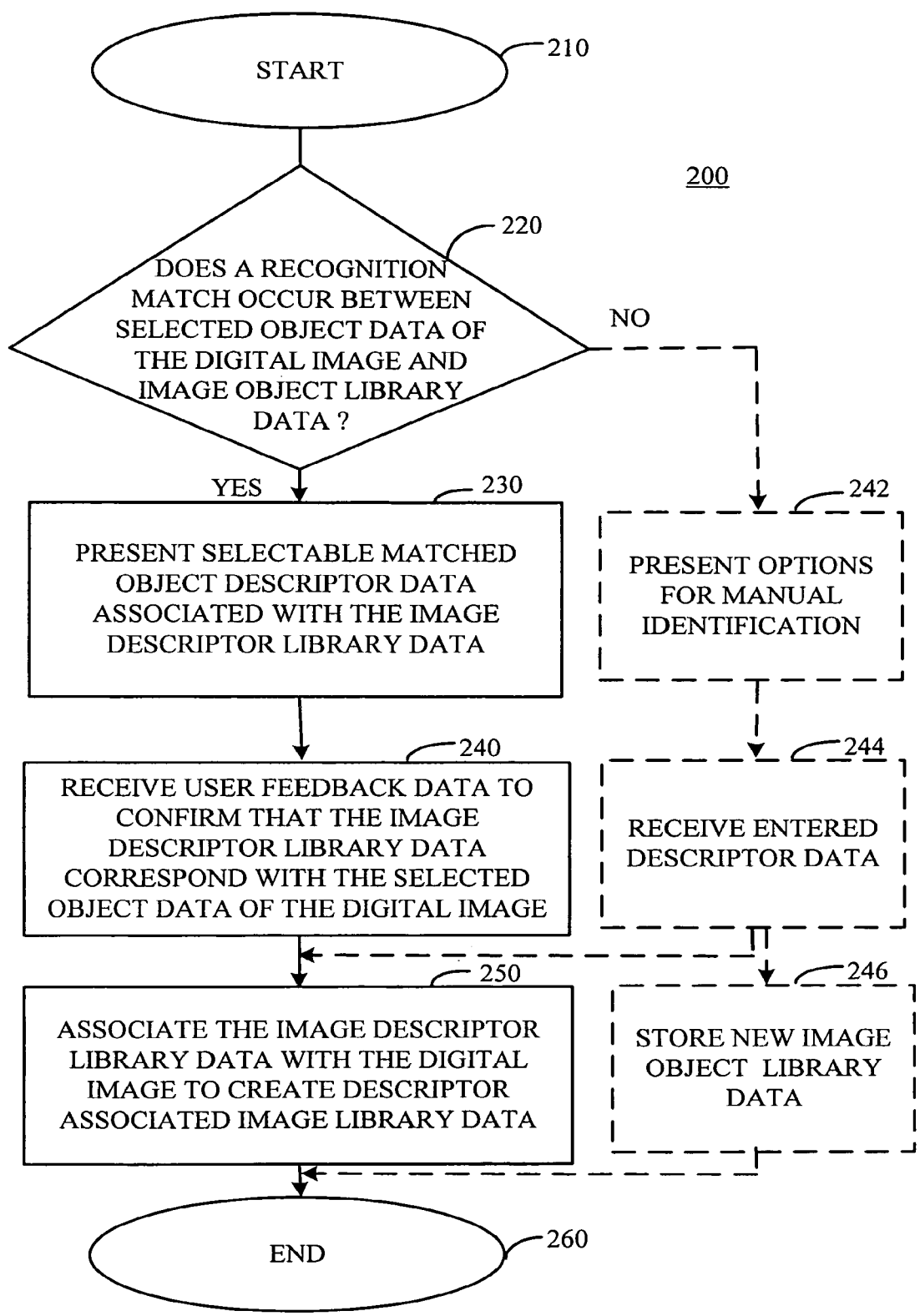
FIG. 2 is a flowchart illustrating one example of a method for an image processing system according to one exemplary embodiment of the invention.

FIG. 2 illustrates an image processing method 200. The method 200 may be carried out by the image processing system 10 with respect to FIG. 1. However, any other suitable structure may also be used. It will be recognized that the method 200, beginning with step 210, will be described as a series of operations, but the operations may be performed in any suitable order and may be repeated in any suitable combination.

As shown in step 220, the object recognizer with automated library generator 20 determines whether a recognition match occurs between selected object data of a digital image 70, such as a picture or image of a person, and the stored image object library data 40, such as a picture or image of one or more people. For example, the object recognizer with automated library generator 20 may compare a digital image of a person with a library of digitized images of people represented as image descriptor library data 50 in the imager library database 62. The image object library data 40 may have previously been associated with the image descriptor library data 50 to create the initial image library database 62 by a user or by the object recognizer with automated library generator 20.

As shown in step 230, if a recognition match is available between the selected object data of the digital image 70 and the image object library data 40, then the object recognizer with automated library generator 20 presents selectable matched object descriptor data 80, such as a name of a person, as potential descriptor data for association with the selected object data of the digital image 70. The selectable matched object descriptor data 80 may be digital data representing text, such as ASCII data in any suitable format. The selectable matched object descriptor data 80 are based on the image descriptor library data 50 associated with each recognition match if one or more recognition matches occur. For example, if the object recognizer with automated library generator 20 generates more than one match between the selected object data of the digital image 70 and the image object library data 40, then the corresponding image descriptor library data 50 for each match may be presented to the user as the selectable matched object descriptor data 80.

As shown in step 240, the memory 30 receives user feedback data 90, such as a name of a person, to confirm that the image descriptor library data 50 corresponds with the selected object data of the digital image 70. If the user feedback data 90 confirms that the image descriptor library data 50 corresponds with the selected object data of the digital image 70, then the image descriptor library data 50 may be associated with the digital image. If, for example, more than one match occurs between the selected object data of the digital image 70 and the image object library data 40, the user may select the image descriptor library data 50 corresponding to the desired image object library data 40 as descriptor associated image library data 60 for association with the digital image 70. According to one embodiment, an automated library user interface displays the image descriptor library data 50 in a menu, and the user provides the user feedback data 90 based on selecting one of the descriptors in the image descriptor library data 50.

As shown in optional step 242, if no recognition match is available or an incorrect match occurs between the selected object data of the digital image 70 and the image object library data 40, then no selectable matched object descriptor data 80 is provided to the user. The object recognizer with automated library generator 20 presents options for manual identification. For example, the user may select from a pull-down menu of a preselected list of descriptor options. Additionally, the user may identify the selected object data of the digital image 70 as new object data for learning purposes.

As shown in optional step 244, the user may provide entered descriptor data 348 (discussed below with respect to FIG. 3) for association with the digital image 70 to create descriptor associated image library data 60. For example, the user may manually enter the entered descriptor data 348 to produce the descriptor associated image library data 60. According to one embodiment, if the user most often enters the names of family members captured in a digital image, then the user may simply select from a pull-down menu of names to quickly and efficiently associate with the selected object data of the digital image 70.

As shown in optional step 246, to facilitate learning of new objects, the descriptor associated image library data 60 may be stored as the image object library data 40 in memory 30. Accordingly, the new image object library data 40 may continue to accumulate in the image library data 60 to facilitate learning of new object data.

As shown in step 250, the object recognizer with automated library generator 20 may associate the descriptor associated image library data 60 with the digital image 70. To facilitate learning of new descriptors, entered descriptor data 348 may be added to with the image descriptor library data 50 if no recognition match, or an incorrect recognition match, occurs.

Figure 3:
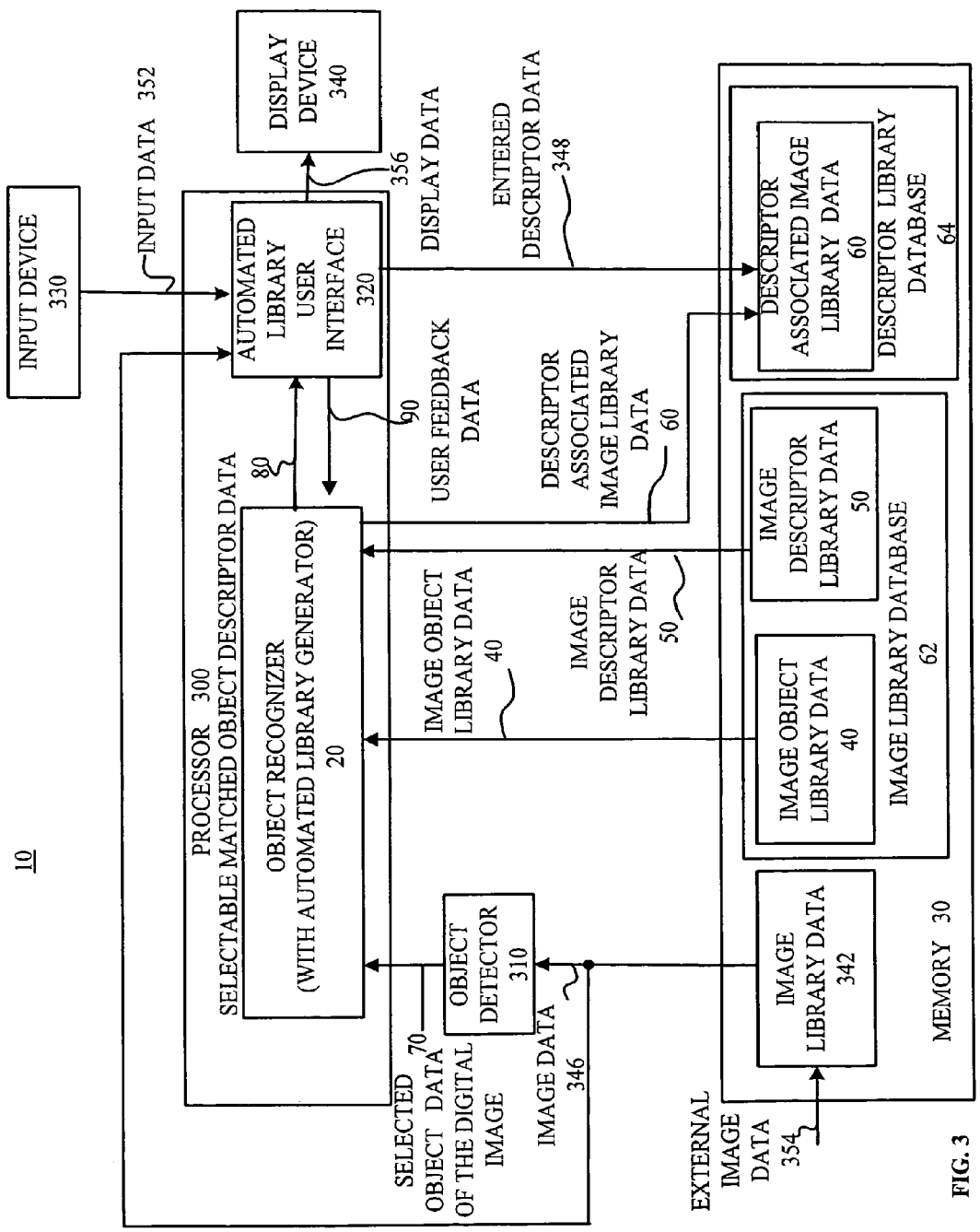
FIG. 3 is a block diagram illustrating another example of the image processing system in accordance with another exemplary embodiment of the invention.

FIG. 3 is a block diagram of the image processing system 10, as previously discussed with respect to FIG. 1, further including a processor 300 employing the object recognizer with automated library generator 20 in accordance with another embodiment of the invention. The image processing system 10 further includes an object detector 310, an automated library user interface 320, an input device 330 and a display device 340. The memory 30 further includes image library data 342. The image library data 342 may be in any suitable electronic format such as JPEG, TIFF, PDF, MPEG.

The processor 300 may be one or more suitably programmed processors, such as a microprocessor, a microcontroller or a digital signal processor (DSP), and therefore includes associated memory, such as memory 30, which contains instructions that, when executed, cause the processor 300 to carry out the operations described herein. In addition, the processor 300, as used herein, may include discrete logic, state machines or any other suitable combination of hardware, software, middleware and/or firmware.

The object detector 310 analyzes the image data 346 and selects one of the objects within the image data 346, if more than one object exists, and in response produces the selected object data of the digital image 70 based on the selected object. For example, a user may select one object from several objects, such as a first person in an image of multiple people. As a result, the object detector 310 may select and provide different objects as selected object data of the digital image 70 to the object recognizer with automated library generator 20 for performing the object recognition method 200. The object detector 310 may be external to the object recognizer with automated library generator 20 or alternatively may be integrated into the object recognizer with automated library generator 20 such that the object recognizer with automated library generator 20 may directly receive the image data 346.

The object detector 310 may receive the image data 346 and, in response, produce the selected object data of the digital image 70. The image data 346 may represent images, such as still images, an image of a photograph, or moving images, such as video, film and video clips. According to one embodiment, the image data 346 may represent an image including one or several objects. The memory 30 may produce the image data 346 based on sequentially generating images stored as the image library data 342.

The object recognizer with automated library generator 20 provides the descriptor associated image library data 60 to the descriptor library database 64 when a recognition match occurs between the selected object data of the digital image 70 and the image object library data 40. Similarly, a user may provide entered descriptor data 348 to the descriptor library database 64 via the automated library user interface 320 when no recognition match occurs between the selected object data of the digital image 70 and the image object library data 40. In response, the descriptor library database 64 stores the descriptor associated image library data 60 and the entered descriptor data 348.

The automated library user interface 320 is coupled between the object recognizer with automated library generator 20, the display device 340, the input device 330 and the memory 30. The input device 330 provides the input data 352 such as user feedback data 90 to the processor 300. The automated library user interface 320 receives the selectable matched object descriptor data 80 from the object recognizer with automated library generator 20 when a recognition match occurs. The automated library user interface 320 may then provide the selectable matched object descriptor data 80 to the display device 340 as display data 356 to display the selectable matched object descriptor data 80. As previously discussed, if more than one object descriptor is provided in the selectable matched object descriptor data 80 because more than one recognition match occurred, then the display device 340 may suitably provide the matched object descriptors as the selectable marked object descriptor data 80 for selection by the user. As a result, the user may then select an object descriptor by providing appropriate input data 352 as the descriptor associated image library data 60 to the descriptor library database 64 for storage into the memory 30.

Figure 4:
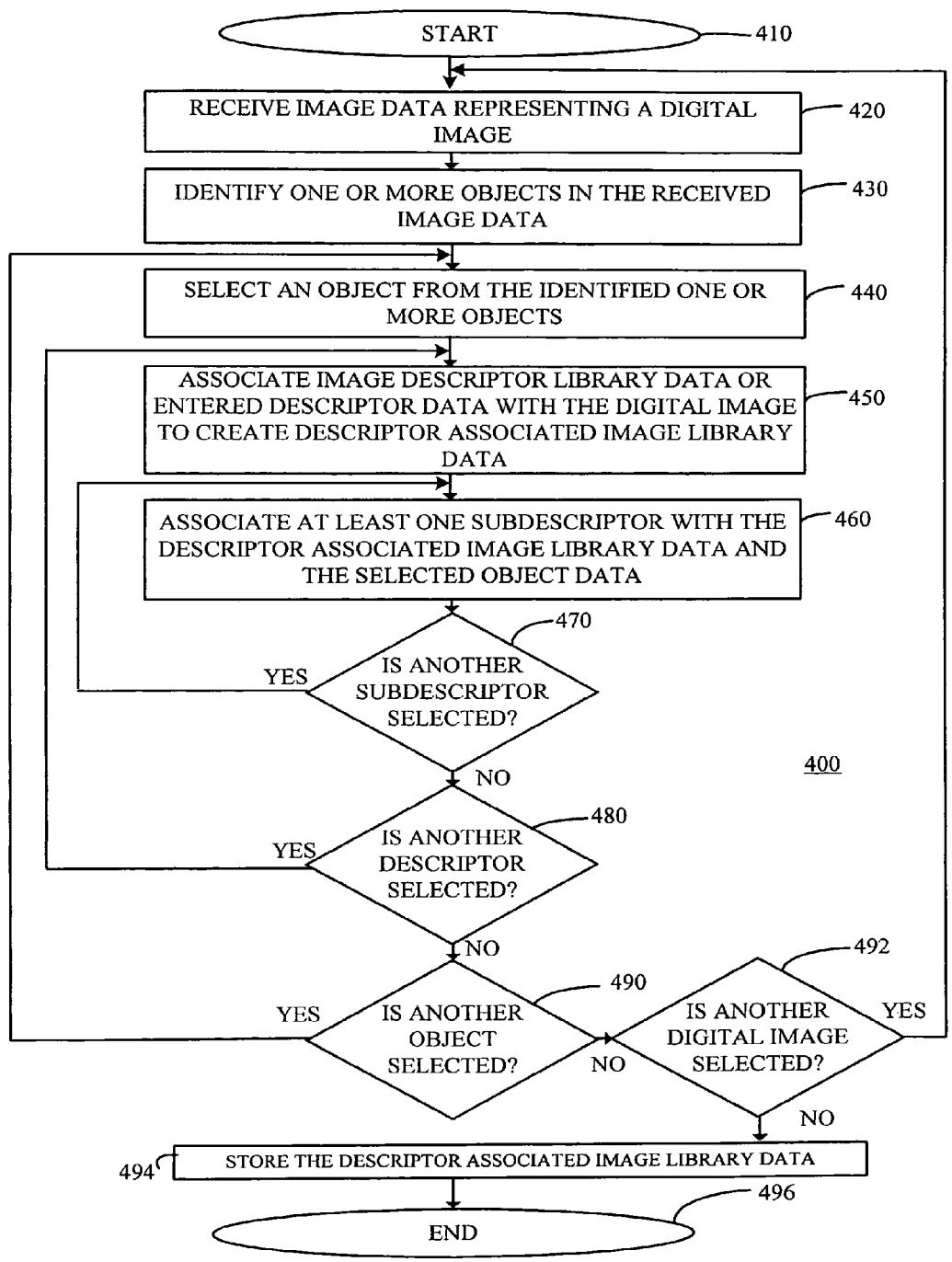
FIG. 4 is a flowchart illustrating another example of a method for an image processing system according to another exemplary embodiment of the invention.

FIG. 4 illustrates a method 400 for performing the object recognition method 200 on one or more objects and for associating at least one descriptor and, optionally, at least one subdescriptor with the digital image as descriptor associated image library data 60. The method 400 may be carried out by the object recognizer with automated library generator 20. However, any suitable structure may also be used. It will also be recognized that method 400, beginning with step 410, will be described as a series of operations; however, the operations may be performed in any suitable order and may be repeated in any suitable combination.

As shown in step 420, the object recognizer with automated library generator 20 or, alternatively, the object detector 310 may receive the image data 346. As previously stated, the image data 346 may be associated with image library data 342 stored in the memory 30. For example, the memory 30 may receive the external image data 354 for example, from a digital camera, a camcorder, a memory card, the Internet or any suitable source for providing the external image data 354. According to this embodiment, the external image data 354 is stored in the memory 30 as image library data 342. The image library data 342 is not yet associated with a descriptor. The object detector 310, the object recognizer with automated library generator 20, or the automated library user interface 320 may therefore access the image library data 324 to produce the image data 346 for association with a descriptor as described below.

As shown in step 430, the object detector 310 identifies at least one object in the received image data 346. As previously stated, the object detector 310 may perform object recognition by performing image recognition, as known in the art, on the received image data 346. As previously discussed, the object detector 310 may detect multiple objects within the image data 346 and select one object at a time to be processed by the object recognizer with automated library generator 20. Alternatively, the object detector 310 may provide multiple objects in parallel to the object recognizer with automated library generator 20 for processing in order to perform object recognition of the image data 346 faster than, for example, serial processing. According to one embodiment, object detection may be performed by the object recognizer with automated library generator 20 at the same time as image recognition is performed by the object recognizer with automated library generator 20.

As shown in step 440, the object detector 310 selects at least one object from the one or more objects detected in step 430 and provides the selected object data of the digital image 70 to the object recognizer with automated library generator 20. Alternatively, the user may select the object for processing by the object recognizer with automated library generator 20. The object detector 310 may select a first object for processing and then sequentially select the remaining objects for processing by the object recognizer with automated library generator 20.

As shown in step 450, either the object recognizer with automated library generator 20 associates the image descriptor library data 50 with the digital image to create descriptor associated image library data 60 or the user provides entered descriptor data 348 for association with the digital image 70 to produce the descriptor associated image library data 60 as previously described with respect to the method 200. A user may also add new descriptors as entered descriptor data 348 to create the descriptor associated image library data 60 for association with the digital image 70.

As shown in step 460, the method 200 may be repeated to associate at least one subdescriptor with the digital image to produce the descriptor associated image library data 60. For example, as previously stated with respect to step 450, the descriptor associated image library data 60 may be associated with a descriptor type attribute, such as person attribute data indicating that the descriptor has an attribute type of a person. Accordingly, as will be described with respect to FIG. 5 below, the subdescriptor data may be associated with the person attribute data 510, such as facial expression attribute data 518 and activity attribute data 522. Other exemplary attribute associations are described. A user may also add new subdescriptors as entered descriptor data 348 to create the descriptor associated image library data 60 for association with the digital image 70.

As shown in step 470, if the user selects another subdescriptor, such as a second or any subsequently selected subdescriptor, then the descriptor associated image library data 60 may be associated with other subdescriptor data for further association with the selected object data of the digital image 70. For example, the object recognizer with automated library generator 20 may perform image recognition analysis on the other selected object data 70 at step 460 in order to determine whether the subdescriptor data associated with the selected object data of the digital image 70 may be a match with the image object library data 40. If the object recognizer with automated library generator 20 matches the subdescriptor data with image object library data 40, then the object recognizer with automated library generator 20 provides the selectable matched object descriptor data 80 with the appropriate subdescriptor data options to the automated library user interface 320. As previously described, the user may select from the subdescriptor data options provided in the selectable matched object descriptor data 80.

As shown in step 480, if another subdescriptor is not selected, then the object recognizer with automated library generator 20 determines whether another descriptor should be selected. For example, if the user desires to associate another descriptor with the object within image data 346, then the user may provide descriptor data or cause the object recognizer with automated library generator 20 to perform image recognition on another object selected by the user as previously described with respect to step 450.

As shown in step 490, if the user identifies another object, such as a second object, a third object and so on, within the image data 346, then the object recognizer with automated library generator 20 receives the selected object data of the digital image 70 corresponding to the identified other object within the digital image. As a result, processing returns to step 440 to associate any descriptor associated image library data 60, and any desired subdescriptor data with the selected object data of the digital image 70 corresponding to the identified other object. The object recognizer with automated library generator 20 performs image recognition on the selected object data of the digital image 70 at step 450, as previously discussed. For example, if the user identifies a new object in the image data 346, then the user may also identify a new descriptor for association with the selected object data of the digital image 70. If the user desires to add a new subdescriptor for association with the selected object data of the digital image 70, then the user may identify a new subdescriptor as entered descriptor data 348 to the descriptor library database 64 and to the memory 30 for association via the descriptor associated image library data 60. For example, the newly added descriptor associated image library data 60 and any associated subdescriptor data may be associated with the digital image, so as to facilitate the learning of new image descriptor library data 50.

As shown in step 492, if the user selects another digital image for association with the descriptor associated image library data 60, then processing of the other digital image returns to step 420. If no new digital image is selected, then image processing ends for the current digital image. As shown in step 494, the descriptor associated image library data 60 is stored in memory 30. Although processing is shown at step 494 to end, the method 400 may continue processing at any suitable stage, including at step 410.

Figure 5:
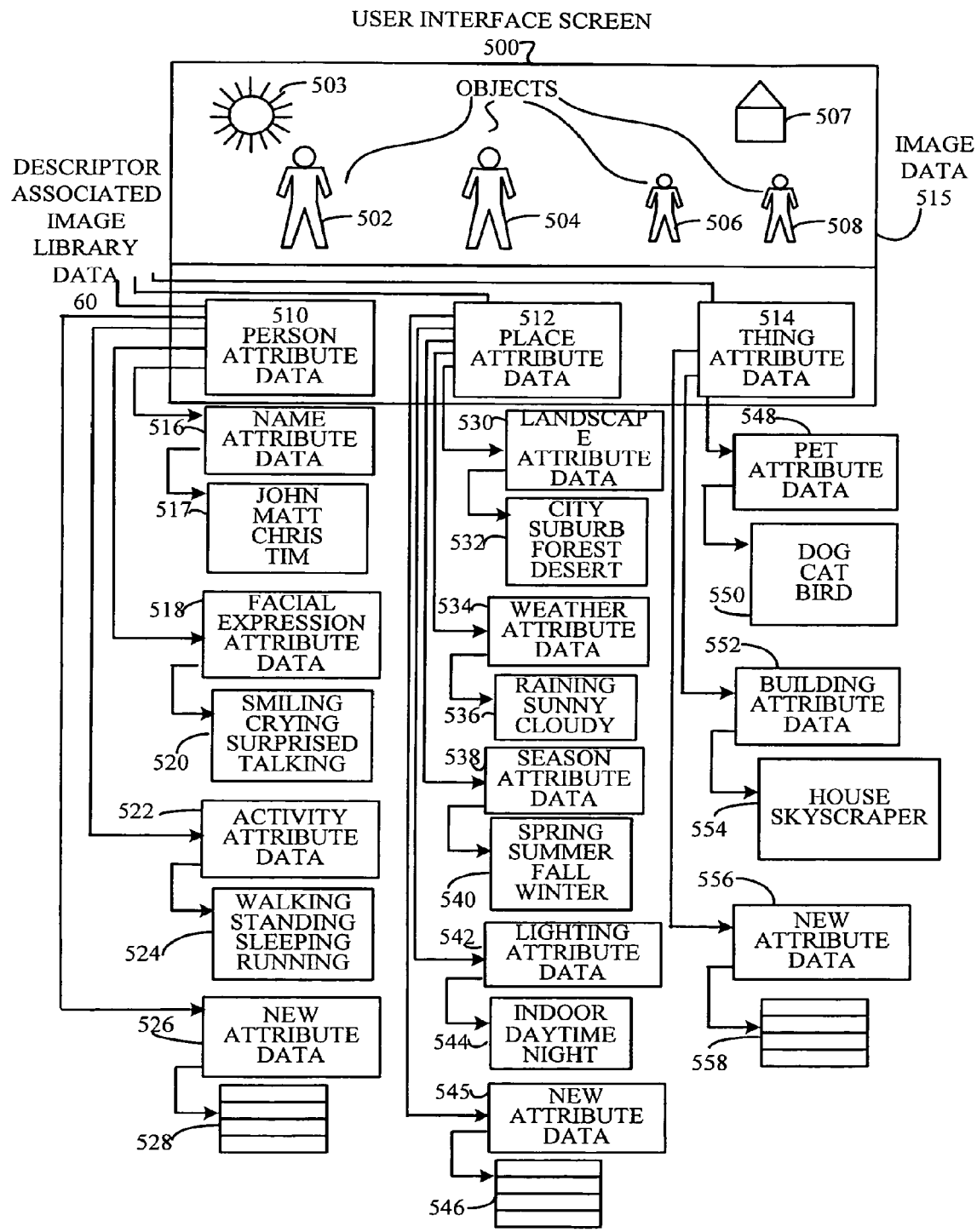
FIG. 5 illustrates an example of a user interface screen according to one exemplary embodiment of the invention.

FIG. 5 illustrates an example of a user interface screen 500 and some possible associated pull-down menus according to one exemplary embodiment of the invention. The user interface screen 500 illustrates image data, including objects 502, 503, 504, 506, 507 and 508. According to one embodiment, each object 502, 503, 504, 506, 507 and 508 represents selected object data of the digital image 70 received by the object recognizer with automated library generator 20. In response, either the object detector 310 or the object recognizer with automated library generator 20 identifies objects 502, 503, 504, 506, 507 and 508. According to this embodiment, the descriptor associated image library data 60 may include person attribute data 510, place attribute data 512 and thing attribute data 514.

According to one example, a user may select object 502 from the image data 515 and associate object 502 with either image descriptor library data 50 or entered descriptor data 348 to create the descriptor associated image library data 60, such as person attribute data 510. The user may then further associate subdescriptors with the person attribute data 510, such as by adding name attribute data 516. As shown in exemplary FIG. 5, upon performing the image recognition method 200, the name attribute data 516 associated with the selectable matched object descriptor data 80 may include options such as the names in a pull-down menu including John, Matt, Chris and Tim 517. Accordingly, the user may select the desired names to associate with the name attribute data 516 by selecting one of the names in the pull-down menu including John, Matt, Chris and Tim 517 for the name attribute data 516. Further, the user may select additional subdescriptor data such as facial expression attribute data 518. In accordance with this example, the facial expression attribute data 518 may include a pull-down menu including smiling, crying, surprise and talking 520. Other facial expression attribute data 518 corresponding to other suitable characteristics may be included as well.

According to another embodiment, the person attribute data 510 may be associated with activity attribute data 522. For example, the activity attribute data 522 may include pull-down menu options such as walking, standing, sleeping and running 524. The attribute pull-down menu options 524 may include more, fewer or any suitable number of attribute pull-down menu options. A user may also add new attribute data 526 to associate with the person attribute data 510 if desired. The user may associate the new attribute data 526 with new specific pull-down attributes 528, as described above.

The place attribute data 512 may be associated with landscape attribute data 530. The landscape attribute data 530 may include in a pull-down menu landscape attribute options such as city, suburb, forest and desert 532. The place attribute data 512 may also be associated with weather attribute data 534. For example, the weather attribute data 534 may include in a pull-down menu, weather attribute options such as rain, sun and clouds 536. Additionally, the place attribute data 512 may be associated with season attribute data 538. The season attribute data 538 may include in a pull-down menu attribute options such as spring, summer, fall and winter 540. The place attribute data 512 may further be associated with lighting attribute data 542. The lighting attribute data 542 may include, in a pull-down menu, lighting attribute options such as indoor, daytime and night time lighting 544. Further, if the user desires to enter a new subdescriptor association with the place attribute data 512, then the user may add new attribute data 545. The user may associate the new attribute data 545 with new attribute options 546 in a pull-down menu.

The thing attribute data 514 may be associated with animal attribute data 548 in a pull-down menu. Animal attribute data 548 may be associated with animal attributes such as dog, cat and bird 550. The thing attribute data 514 may further be associated with building attribute data 552. The building attribute data 552 may further include a house, a skyscraper or any suitable type of building or structure 554 in a pull-down menu. If the user wishes to associate another subdescriptor for association with the thing attribute data 514, then the user may select new attribute data 556. The user may associate the new attribute data 556 with new attribute options 558 in a pull-down menu.

The descriptor associated image library data 60 may include any other suitable type of attribute data such as event attribute data. For example, the user may further associate subdescriptors with the event attribute data, such as by adding party attribute data, family event attribute data and vacation attribute data.

Figure 6:
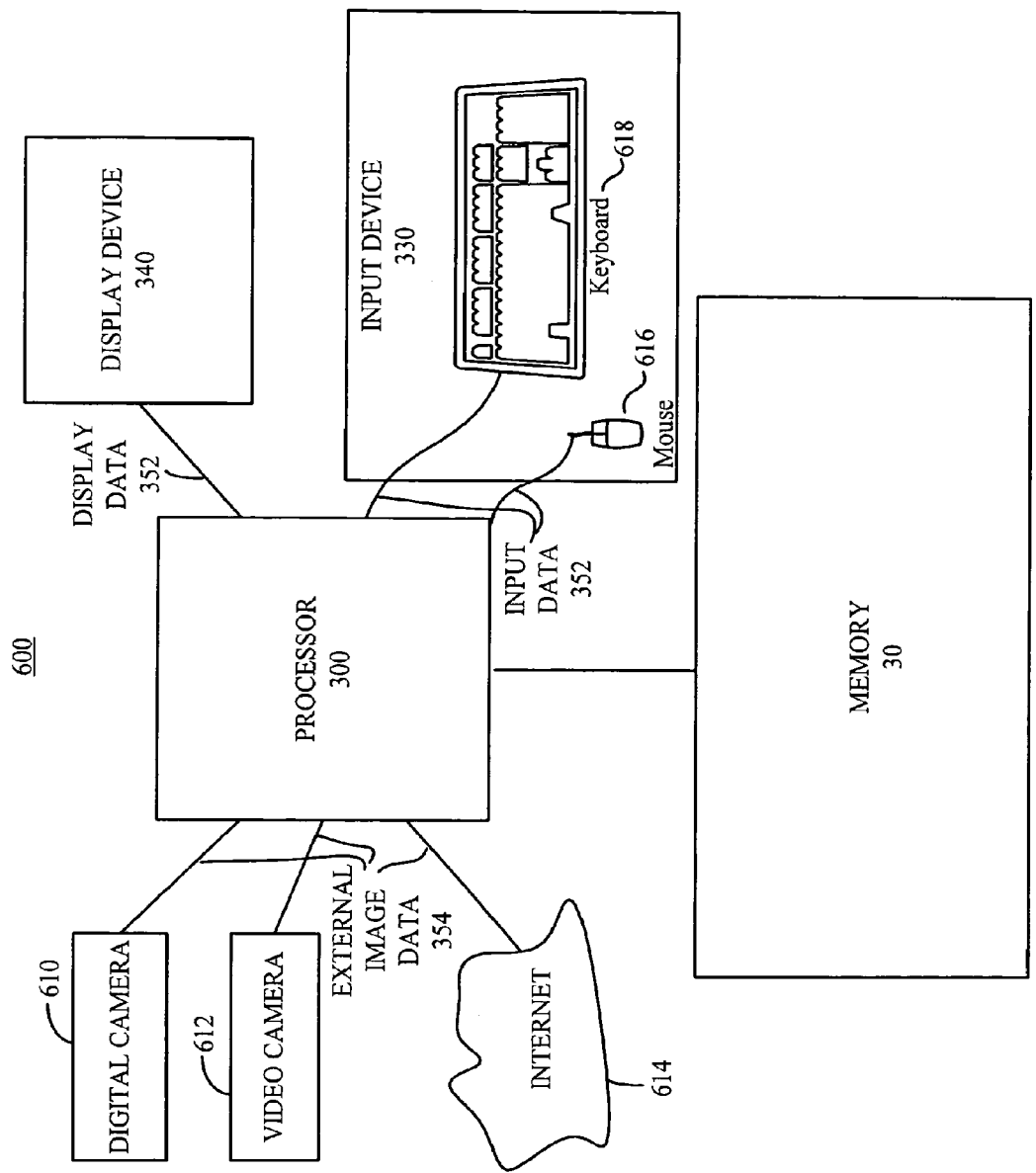
FIG. 6 is a block diagram illustrating another example of the image processing system in accordance with another exemplary embodiment of the invention.

FIG. 6 is a block diagram illustrating another example of an image processing system 600 in accordance with another exemplary embodiment of the invention. FIG. 6 includes the processor 300, the input device 330, including a mouse 616 and keyboard 618, a digital camera 610, a video camera 612, and the Internet 614. The various elements of the image processing system 600 are connected by a plurality of links. The links may be any suitable mechanisms for conveying electrical signals or data, as appropriate.

According to this embodiment, the external image data 354 may be provided by a digital camera 610, the Internet 614, video camera 612, a video game, a camera equipped PDA (personal data assistant), a camera equipped wireless telephone, or any suitable source as is known in the art. The external image data 354 may be in any suitable format such as JPEG, TIFF, PDF, or MPEG for example. As previously described, the image data 346 may also be provided by the memory 30. The input device 330 may include the mouse 616 and the keyboard 618 for providing input data 352 to the processor 300. According to this embodiment, the automated library user interface 320 of FIG. 3 is embedded into processor 300, although the automated library user interface 320 may be external to the processor 300. The image processing system 600 may include other elements, fewer elements or more elements than those shown in FIG. 6.

Among other advantages, the present invention quickly and efficiently generates descriptor associated image library data 60 associating either image descriptor library data or entered descriptor data 348 with the image data 346 to create the descriptor library database 64. Among other advantages, the present invention quickly and efficiently generates the descriptor associated image library data 60. The object recognizer with automated library generator 20 automatically performs image recognition by attempting to match the selected object data of the digital image 70 with image object library data 40 previously associated with image descriptor library data 50. When a recognition match occurs between the image object library data 40 and the selected object data of the digital image 70, the object recognizer with automated library generator 20 automatically presents to the user the selectable matched object descriptor data 80 associated with the image descriptor library data 50. A user may provide user feedback data 90 to confirm that the image descriptor library data associated with the selectable matched object descriptor data 80 actually matches the selected object data of the digital image 70. Since the selectable matched object descriptor data 80 is automatically generated by the object recognizer with automated library generator 20, the user may simply select from a list of available descriptors produced in the selectable matched object descriptor data 80 for association with the digital image. Alternatively, the user may simply select an attribute in a pull-down menu for association with the digital image. Stated another way, the object recognizer adds the descriptor associated image data 60 to the descriptor library database 64 based on image descriptor library data 50 previously associated with the image object library data 40 within the image library database 62. As a result, the object recognizer with automated library generator 20 may quickly and efficiently generate a library of descriptor associated image data 60 in order to facilitate a later search for the desired image data.

If no recognition match is available between the selected object data of the digital image 70 and the image object library data 40, then the user may provide entered descriptor data 348 for association with the selected object data of the digital image 70, thereby facilitating the creation of new image object library data 40 and the corresponding image descriptor library data 50. For example, the selectable matched object descriptor data 80 may include recently or commonly selected descriptor data in the event a match does not occur. Accordingly, the image processing system 10, 600 "learns" new image object library data 40 and the new image descriptor library data 50 for future automated recognition. As the image object library data 40 and the image descriptor library data 50 grow in size, then the likelihood that the selected object data of the digital image 70 was already previously associated with image descriptor library data 50 increases. Therefore, as the library grows in size, the image processing system 10 further increases the speed and efficiency of creating the selectable matched object descriptor data 80. Further, the creation of the selectable matched object descriptor data 80 permits the image processing system 10, 600 to add new image object library data 40 and image descriptor library data 50 and improves the ability to search for specific image descriptor library data 50.

It is understood that the implementation of other variations and modifications of the present invention and its various aspects will be apparent to those of ordinary skill in the art and that the invention is not limited by the specific embodiments described herein. It is therefore contemplated to cover by the present invention any and all modifications, variations or equivalents that fall within the spirit and scope of the basic underlying principles disclosed and claimed herein.

The invention claimed is:

1. An image processing method carried out by an image processing system, comprising:
   determining, by an electronic recognition process, if a recognition match occurs between selected object data of a digital image and image object library data, wherein the image object library data are associated with image descriptor library data;
   presenting a plurality of selectable matched object descriptor data associated with the image descriptor library data when a recognition match is determined between the selected object data of the digital image and the image object library data;
   receiving feedback data in response to presenting the plurality of selectable matched object descriptor data to confirm that the image descriptor library data corresponds with the selected object data of the digital image wherein the feedback data comprises a selected one of the plurality of selectable matched object description data; and
   in response to the feedback data, associating the image descriptor library data with the digital image to create descriptor associated image library data and adding the created descriptor associated image library data as stored new object library data.

2. The method of claim 1 including:
  receiving entered descriptor data to associate with the digital image; and
  creating the descriptor associated image library data in response to receiving the entered descriptor data when at least one of: (a) no recognition match is determined between the selected object data of the digital image and the image object library data, and (b) the feedback data indicates that the image descriptor library data do not correspond with the selected object data of the digital image.

3. The method of claim 1 wherein the selected object data of the digital image represent a plurality of objects in the digital image, the method further including:
  determining, by the electronic recognition process, if a recognition match occurs between each of the plurality of objects in the digital image and the image object library data;
  presenting the plurality of selectable matched object descriptor data associated with the image descriptor library data when a recognition match is determined between the corresponding plurality of objects in the digital image and the image object library data;
  receiving feedback data in response to presenting the plurality of selectable matched object descriptor data to confirm that the image descriptor library data associated with the plurality of selectable matched object descriptor data match the corresponding plurality of objects in the digital image; and
  in response to the feedback data, associating the image descriptor library data with the digital image for each of the corresponding plurality of objects to create corresponding descriptor associated image library data and adding the created descriptor associated image library data as stored new object library data.

4. The method of claim 1 wherein the descriptor associated image library data include subdescriptor data associated with the selected object data of the digital image.

5. The method of claim 1 wherein the descriptor associated image library data are selected from at least one of: person attribute data, place attribute data, thing attribute data and event attribute data.

6. The method of claim 5 wherein the person attribute data are associated with at least one of: name attribute data, facial expression attribute data and activity attribute data; wherein the place attribute data are selected from at least one of: landscape attribute data, weather attribute data, season attribute data and lighting attribute data; wherein the thing attribute data are selected from at least one of: animal attribute data and building attribute data; and wherein the event attribute data are selected from party attribute data, family event attribute data and vacation attribute data.

7. The method of claim 1 including generating the selected object data of the digital image in response to selecting at least one of: the digital image, and a portion of the digital image, by at least one of: a user and an electronic object recognizer.

8. The image processing method of claim 1 comprising presenting subdescriptor data comprising at least one of:
  facial expression attribute data;
  activity attribute data; and
  place attribute data.

9. An image processing method carried out by an image processing system, comprising:
  receiving image data representing a digital image;
  generating selected object data of the digital image in response to receiving the image data;
  determining, by an electronic recognition process, if a recognition match occurs between the selected object data of the digital image and image object library data, wherein the image object library data are associated with image descriptor library data;
  presenting a plurality of selectable matched object descriptor data associated with the image descriptor library data when a recognition match is determined between the selected object data of the digital image and the image object library data;
  receiving feedback data in response to presenting the plurality of selectable matched object descriptor data to confirm that the image descriptor library data corresponds with the selected object data of the digital image wherein the feedback data comprises a selected one of the plurality of selectable matched object description data; and
  in response to the feedback data, associating the image descriptor library data with the digital image to create descriptor associated image library data and adding the created descriptor associated image library data as stored new object library data.

10. The method of claim 9 wherein the image data represent a plurality of digital images such that each of the plurality of digital images is associated with corresponding descriptor associated image library data, including:
  storing the descriptor associated image library data associated with each of the corresponding plurality of digital images; and
  creating at least one of: a table of contents, an index and a photo album including the descriptor associated image library data associated with each of the corresponding plurality of digital images.

11. The method of claim 9 including:
  receiving entered descriptor data to associate with the digital image; and
  creating the descriptor associated image library data in response to receiving the entered descriptor data when at least one of: (a) no recognition match is determined between the selected object data of the digital image and the image object library data, and (b) the feedback data indicates that the image descriptor library data do not correspond with the selected object data of the digital image.

12. The method of claim 8 wherein the selected object data of the digital image represent a plurality of objects in the digital image, the method further including:
  determining, by the electronic recognition process, if a recognition match occurs between each of the plurality of objects in the digital image and the image object library data;
  presenting the plurality of selectable matched object descriptor data associated with the image descriptor library data when a recognition match is determined between the corresponding plurality of objects in the digital image and the image object library data;
  receiving feedback data in response to presenting the plurality of selectable matched object descriptor data to confirm that the image descriptor library data associated with the plurality of selectable matched object descriptor data match the corresponding plurality of objects in the digital image; and
  in response to the feedback data, associating the image descriptor library data with the digital image for each of the corresponding plurality of objects to create corresponding descriptor associated image library data and adding the created descriptor associated image library data as stored new object library data.

13. The method of claim 9 including generating the selected object data of the digital image based on selecting at least one of: the digital image, and a portion of the digital image, by at least one of: a user and an electronic object recognizer.

14. An image processing system comprising:
memory containing image object library data and image descriptor library data associated with the image object library data; and
an object recognizer, operatively coupled to the memory, and operative to receive selected object data of a digital image, the image object library data and the image descriptor library data and, in response, to determine, by an electronic recognition process, if a recognition match occurs between the selected object data of the digital image and the image object library data, and to present a plurality of selectable matched object descriptor data associated with the image descriptor library data when a recognition match is determined between the selected object data of the digital image and the image object library data, such that the object recognizer is operative to receive feedback data in response to the presented selectable matched object descriptor data to confirm that the image descriptor library data corresponds with the selected object data of the digital image, wherein the feedback data comprises a selected one of the plurality of selectable matched object description data and wherein the image descriptor library data is, in response to the feedback data, associated with the digital image to create descriptor associated image library data and adding the created descriptor associated image library data as stored new object library data.

15. The image processing system of claim 14 wherein the memory is operative to receive entered descriptor data to associate with the digital image and to create the descriptor associated image library data when at least one of: (a) no recognition match is determined between the selected object data of the digital image and the image object library data, and (b) the feedback data indicates that the image descriptor library data do not correspond with the selected object data of the digital image.

16. The image processing system of claim 14, including a user interface, operatively coupled to the object recognizer, and operative to receive the plurality of selectable matched object descriptor data and, in response, to display the plurality of selectable matched object descriptor data.

17. The image processing system of claim 14, including an object detector, operatively coupled to the memory and to the object recognizer, and operative to receive image data representing the digital image and, in response, to provide the selected object data of the digital image to the object recognizer.

18. The image processing system of claim 14 wherein the selected object data of the digital image are generated in response to selecting at least one of: the digital image, and a portion of the digital image, by at least one of: a user and the object recognizer.

19. An image processing system comprising:
memory containing image object library data and image descriptor library data associated with the image object library data;
a processor coupled to the memory, the processor operative to:
receive selected object data of a digital image, the image object library data and the image descriptor library data and, in response, to determine, by an electronic recognition process, if a recognition match occurs between the selected object data of the digital image and the image object library data, and to produce a plurality of selectable matched object descriptor data associated with the image object library data when a recognition match is determined between the selected object data of the digital image and the image object library data; and
provide a user interface operative to present the plurality of selectable matched object descriptor data and, in response, to provide feedback data to the object recognizer to confirm that the image descriptor library data corresponds with the selected object data of the digital image;
wherein the image descriptor library data are, in response to the feedback data, associated with the selected object data of the digital image to create descriptor associated image library data and wherein the processor is operative to add the created descriptor associated image library data as stored new object library data and wherein the feedback data selects one of the plurality of selectable matched object description data.

20. The image processing system of claim 19 wherein the processor is operative to receive image data representing the digital image and, in response, to provide the selected object data of the digital image to the object recognizer.

21. Memory containing instructions executable by one or more processing devices that cause the one or more processing devices to:
determine, by an electronic recognition process, if a recognition match occurs between selected object data of a digital image and image object library data, wherein the image object library data are associated with image descriptor library data;
present a plurality of selectable matched object descriptor data associated with the image descriptor library data when a recognition match is determined between the selected object data of the digital image and the image object library data;
receive feedback data in response to presenting the plurality of selectable matched object descriptor data to confirm that the image descriptor library data corresponds with the selected object data of the digital image wherein the feedback data comprises a selected one of the plurality of selectable matched object description data; and
in response to the feedback data, associate the image descriptor library data with the digital image to create descriptor associated image library data and adding the created descriptor associated image library data as stored new object library data.

22. The memory of claim 21 containing executable instructions that cause the one or more processing devices to:
receive entered descriptor data to associate with the digital image and in response create the descriptor associated image library data when at least one of: (a) no recognition match is determined between the selected object data of the digital image and the image object library data, and (b) the feedback data indicate that the image descriptor library data do not correspond with the selected object data of the digital image.

23. An image processing method carried out by an image processing system, comprising:
determining, by an electronic recognition process, if a recognition match occurs between selected object data of a digital image and image object library data, wherein the image object library data are associated with image descriptor library data;

presenting a plurality of selectable matched object descriptor data associated with the image descriptor library data when a recognition match is determined between the selected object data of the digital image and the image object library data; and in response to selected object descriptor data from the plurality of selectable matched object descriptor data, associating the image descriptor library data with the digital image to create descriptor associated image library data and adding the created descriptor associated image library data as stored new object library data.

\* \* \* \* \*

UNITED STATES PATENT AND TRADEMARK OFFICE
CERTIFICATE OF CORRECTION

PATENT NO. : 8,874,596 B2  
APPLICATION NO. : 12/500801  
DATED : October 28, 2014  
INVENTOR(S) : Bandas It is certified that error appears in the above-identified patent and that said Letters Patent is hereby corrected as shown below:

In the Claims

Claim 3, Column 13, Line 23, please delete "corresponding"

Claim 3, Column 13, Line 29, please delete "corresponding"

Claim 3, Column 13, Line 33, please delete "corresponding"

Claim 10, Column 14, Line 29, please delete "of the"

Claim 10, Column 14, Line 29, after "corresponding" please add "digital image of the"

Claim 10, Column 14, Line 33, please delete "of the"

Claim 10, Column 14, Line 33, after "corresponding" please add "digital image of the"

Claim 12, Column 14, Line 56, please delete "corresponding"

Claim 12, Column 14, Line 62, please delete "corresponding"

Claim 12, Column 14, Line 66, please delete "corresponding"

Claim 14, Column 15, Lines 32-33, please delete "adding" and replace with "to add"

Claim 21, Column 16, Line 48, please delete "adding" and replace with "to add"

Claim 23, Column 17, Line 10, please delete "adding" and replace with "to add"

Signed and Sealed this  
Fifteenth Day of May, 2018

Andrei Iancu  
*Director of the United States Patent and Trademark Office*